Sept. 7, 1965   M. DE VRIES   3,204,997

METHOD AND DEVICE FOR STANDING EGGS ON THEIR POINT

Filed July 11, 1962

INVENTOR,
Marcus de Vries
BY Wenderoth, Lind
and Ponack
Attorneys

United States Patent Office 3,204,997
Patented Sept. 7, 1965

3,204,997
METHOD AND DEVICE FOR STANDING EGGS ON THEIR POINT
Marcus de Vries, Leeuwarden, Netherlands, assignor to N.V. Leeuwarder Papierwarenfabriek, Leeuwarden, Netherlands
Filed July 11, 1962, Ser. No. 209,183
Claims priority, application Netherlands, July 11, 1961, 266,904
1 Claim. (Cl. 294—1)

When storing eggs and especially when packing them it generally is important for their keeping qualities that they are positioned point down. In several sorting machines this desirability is taken into account.

It is already known to lead the eggs through a space formed between two substantially vertical slightly converging planes, the intersecting lines of which are parallel to the horizontal plane and whereby the one plane in respect to the other can be shifted springily in order to reduce the convergence angle between the planes. The object of doing so is when leading the eggs through the space in question to have the eggs during their transportation execute in falling such a tilting movement that the eggs are positioned point down. In this device known in the prior art the eggs are not gripped but by their contact with the mentioned walls and by the position of their center of gravity they get into a tilting movement as they are falling down. Naturally in this known method a stationary device is used, which device has the disadvantage that it is difficult to position a number of eggs simultaneously exactly over the mouth of the cavities in packings and to have them drop into those cavities. Such packings made of paper pulp and provided with a number of cavities arranged in a row are generally known.

The method as per the invention is based upon a different idea and consists of that each of the eggs separately as to its longest axis positioned substantially horizontally, is gripped at two points beyond the longitudinal axis between two planes, is raised in this gripped position and therein executes a tilting movement, upon which the distance between the planes is increased to such extent as to release the egg.

In this invention the known circumstance is efficiently availed of that the center of gravity of an egg lies aside of the plane of the largest diameter and this on the side of the point. Now if an egg is gripped at two points, forming the ends of an axial line of the largest cross circle through the egg, and provided the gripping is done in such way that the egg still is allowed to move, the point will pivot and hang down. It is found that the method in question of gripping an egg and raising it in order to allow for the tilting is feasible in practice in a very simple way. It is not even found essential that the two points where the planes contact the egg are exactly the ends of an axial line through the largest circle of the egg. Also in a slightly different position of the egg in respect of these planes the positioning effect is obtained all the same, although the gripping points should not be at the ends of the longest axis of the egg. However, it is efficient to have the planes grip substantially at the ends of the axial line of the largest circle.

The invention, as well as further particulars pertaining to it are explained and elucidated in accordance with the drawing.

Figure 1:
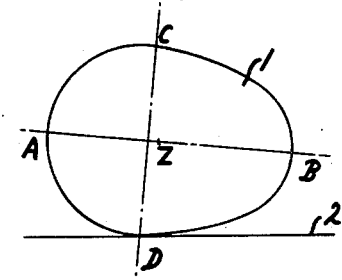
FIG. 1 shows in section an egg with the position of the center of gravity.

When executing the method according to the invention the eggs 1 with their longitudinal axis A–B are positioned substantially horizontally. The center of gravity Z then lies aside of the plane of the largest diameter with the axial line D–C. Now when, as shown in diagram in FIG. 2, at a certain height above the bearing surface 2, the egg is gripped by the organs 3 and 4, as soon as these organs are raised in conjunction, the egg will tilt if the gripping organs 3 and 4 being provided with arches planes can revolve around their axles 5 resp. 6. The gripping organs 3 and 4 are under spring action. They may be sufficiently separated from each other as to allow the egg being placed between the arched planes 7 and 8. After that the planes 7 and 8 may be moved towards each other and under the influence of the springs 9 and 10 the egg then is gripped springily by the planes. Once the tilting movement is over and so the point directed downwards the planes 7 and 8 may be separated from each other, this causing the egg to be released whereupon it can be put into a packing.

Figure 2:
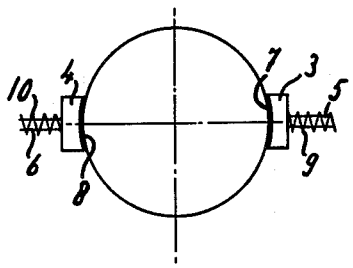
FIG. 2 shows in diagram a device adapted for executing the new method.
Figure 3A:
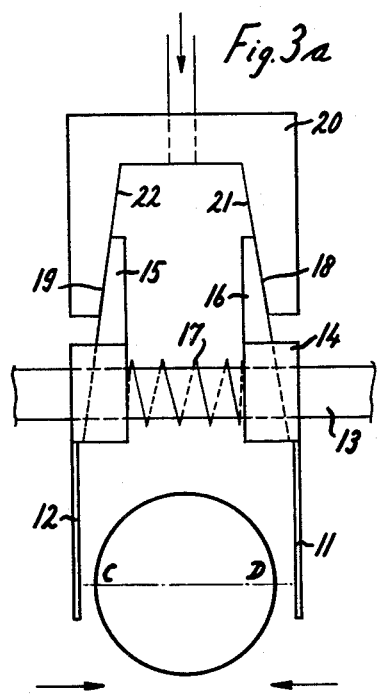
FIGURE 3a is a diagrammatic view illustrating a modification.
Figure 3B:
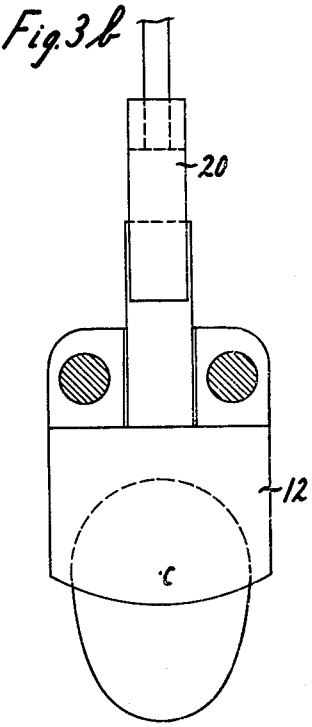
FIGURE 3b is a diagrammatic view of the modification shown in FIGURE 3a taken at right angles thereto and when in raised position.

When employing somewhat arched planes as per FIG. 2 the gripping organs 3 and 4 themselves should be revolving around their axles in order to allow the tilting movement. In the meantime it is found in practice that for firmly gripping the eggs it certainly is not essential to employ arched planes. Flat planes being parallel to each other are very useful indeed. This is shown in diagram in FIGS. 3a and b. The two parallel planes 11 and 12 are arranged at some distance from each other and are movable from and to each other by sliding along an axle 13, passing through bushes 14. A compression spring 17 wound around the axle 13 presses on the extended parts of the planes 15, 16. This compression spring causes the planes 11 and 12 to separate and they can be made to approach each other by compressing the spring 17. As per the illustrated example of execution this pressing takes place in that the sloping inner sides 21, 22 of a follower 20 being movable in the arrow-indicated direction are in contact with bevelled surfaces 18 and 19. As the follower 20 is further pressed in the direction of the egg, the parts 15 and 16 and in consequence the planes 11 and 12 will approach each other more closely. Finally these planes contact the egg at about the points C and D. Now if the egg is raised it will take the position as shown in FIG. 3b in that the eggs tilt over. It is found that the pressure required to sufficiently grip the egg and yet avoid breakage can be easily adjusted in practice.

It is clear that the illustrated examples of execution of the new device are very schematic only and allow for several variants. The appliance as per the invention is very suited to carry a number of eggs arranged in rows into the cavities of an egg packing. The eggs are continuously fed to the appliance according to the invention from a sorting machine from which the eggs sorted to size and arranged closely spaced in rows are transferred. Over each row of delivered eggs a battery of the illustrated gripping devices may be provided. These gripping devices are positioned at such a distance that the eggs gripped and tilted therein hang exactly over the mouth of the closely to each other arranged cavities of a packing the moment they are released. Slight differences in size of the eggs are found not to give any difficulties in practice. Besides by action of the spring the planes 11 and 12 may also be moved towards and from each other with the aid of compressed air or eventually magnetically.

It should be observed that it is essential for the appliance that the planes, at least before an egg is between them, converge whereas then the convergence angle should be changed by the egg. This in consequence of the fact that it is the aim to have the eggs pass between and through the planes. There is a draw-back however in convergent planes according to the invention, especially so if the convergence is great and of the size as mentioned in the prior art. For if in the appliance as per the invention the gripping planes, being executed as flat planes according to the known device, slant, narrowing from above downwards, this would interfere with the right way of tilting and also gripping of the eggs. Should the planes slant, narrowing from below upwards, the tilting would be much easier, however the eggs would be insufficiently gripped.

I claim:

A method for arranging eggs with their point pointing downwardly comprising leading an egg individually into a space between two parallel planes facing each other, each egg as to its longest axis being positioned substantially horizontally when individually gripped by said planes at two points at about the largest diameter of said egg at one side of the center of gravity, moving said planes towards each other to grasp said egg within said space while maintaining the gripping of said egg and then raising said planes whereby said egg executes a tilting movement so that said egg may rotate and tilt point down and then enlarging the distance between said planes to release said egg.

References Cited by the Examiner

UNITED STATES PATENTS

| | | | |
|---|---|---|---|
| 1,139,827 | 5/15 | Watson | 294—86 X |
| 1,298,064 | 3/19 | Lichtenthaeler | 294—106 |
| 1,519,736 | 12/24 | Lewis | 294—86 X |
| 2,177,595 | 10/39 | Freed. | |
| 2,254,595 | 9/41 | Carroll | 198—33.1 |

SAMUEL F. COLEMAN, *Primary Examiner.*

ANDRES H. NIELSEN, WILLIAM B. LA BORDE,
*Examiners.*